United States Patent [19]

Sääsk

[11] Patent Number: 5,290,403
[45] Date of Patent: Mar. 1, 1994

[54] LIQUID EVAPORATING APPARATUS

[76] Inventor: Aapo Sääsk, Veckovägen 4, S-175 41 Järfälla, Sweden

[21] Appl. No.: 67,978

[22] Filed: May 27, 1993

Related U.S. Application Data

[63] Continuation of Ser. No. 625,701, Dec. 11, 1990, abandoned, which is a continuation of Ser. No. 401,457, Sep. 15, 1989, abandoned.

[30] Foreign Application Priority Data

Mar. 17, 1987 [SE] Sweden .................. 8701106-0

[51] Int. Cl.$^5$ ............... B01D 1/00; B01D 3/00
[52] U.S. Cl. .................. 202/182; 55/268; 159/DIG. 27; 159/DIG. 28; 203/10; 203/22; 203/49; 203/DIG. 4; 202/185.2; 202/185.3; 202/201; 202/203; 236/44 B; 96/4
[58] Field of Search ............ 202/182, 185.2, 185.3, 202/201, 203; 203/10, 49, 22, DIG. 4; 159/DIG. 27, DIG. 28; 236/44 B; 55/158, 268, 269, 267; 34/27; 210/634

[56] References Cited

U.S. PATENT DOCUMENTS

| | | | |
|---|---|---|---|
| 2,433,741 | 12/1947 | Crawford | 159/DIG. 28 |
| 3,340,186 | 9/1967 | Weyl | 159/DIG. 27 |
| 3,523,568 | 8/1970 | Van Leeuwen | 159/DIG. 28 |
| 3,532,270 | 10/1970 | Schoen, Jr. | 261/DIG. 34 |
| 3,563,860 | 2/1971 | Henderyckx | 159/DIG. 27 |
| 3,833,044 | 9/1974 | Wallace | 159/DIG. 28 |
| 3,860,492 | 1/1975 | Lowi, Jr. et al. | 159/DIG. 28 |
| 4,310,382 | 1/1982 | Gress | 159/901 |
| 4,584,062 | 4/1986 | Sussmeyer et al. | 159/901 |
| 4,620,900 | 11/1986 | Kimura et al. | 159/DIG. 28 |
| 4,728,397 | 3/1988 | Kjellander et al. | 159/DIG. 27 |

FOREIGN PATENT DOCUMENTS

| | | |
|---|---|---|
| 88315 | 9/1983 | European Pat. Off. . |
| 419699 | 12/1981 | Sweden . |
| 2214835 | 9/1989 | United Kingdom ............ 203/10 |

OTHER PUBLICATIONS

"Low Energy Cost Desalination Processes Using Hydrophobic Membranes", Proceedings of the Second World Congress on Desalination and Water Re-Use, Nov., 17–21, 1987, vol. 3, pp. 277–286.

*Primary Examiner*—Virginia Manoharan
*Attorney, Agent, or Firm*—Sughrue, Mion, Zinn, Macpeak & Seas

[57] ABSTRACT

A liquid evaporating apparatus includes a liquid inlet 1 to which an evaporator 2 is connected which incorporates a gas inlet 28 and gas flow channels defined by vapor-permeable hydrophobic walls 23, 24, 25, 26. The apparatus may be used to moisturize air in a room, in which case it is configured to circulate room air through the evaporator and to discharge vaporized liquid through the output side 22 of the evaporator and into the room. Alternatively, the apparatus may be used to cleanse liquid, in which case it includes a condensing chamber 3 connected to the output side of the evaporator. The apparatus will also include a closed gas loop 4 which is located between the output side and the input side 21 of the evaporator and which incorporates a fan 5 for transporting a vapor-gas mixture continuously to the condensing chamber.

10 Claims, 1 Drawing Sheet

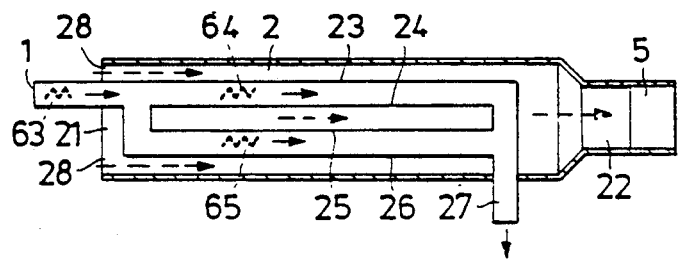
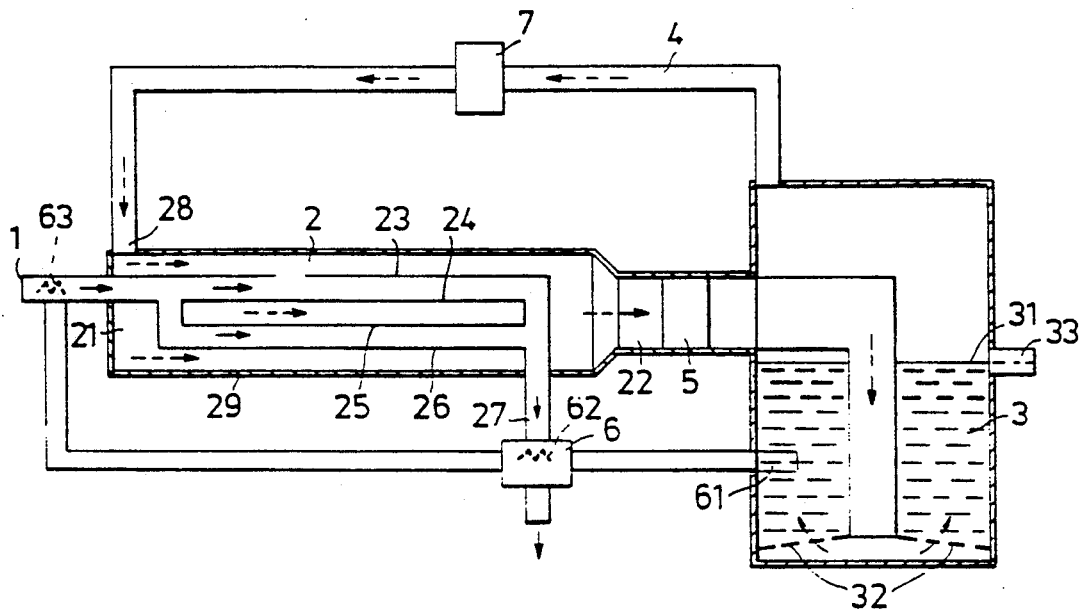

LIQUID EVAPORATING APPARATUS

This is a continuation of application Ser. No. 07/625,701 filed Dec. 11, 1990, now abandoned, which is a continuation of application Ser. No. 07/401,457 filed on Sept. 15, 1989, now abandoned.

TECHNICAL FIELD

The present invention relates to an apparatus for evaporating liquid, e.g. for the purpose of maintaining desired humidity conditions in the air of a room, for the purpose of cleansing a liquid, or for the purpose of separating liquids one from the other. More specifically, although not exclusively, the invention relates to apparatus of the kind which include a liquid inlet and an evaporator which is connected on its input side to the liquid inlet and which comprises walls which are made of a vapor-permeable, hydrophobic material and which limit the extent to which liquid can spread in the evaporator, these walls being referred to as liquid restraining walls.

BACKGROUND PRIOR ART

An excessively low humidity in a room will create problems for the people, furniture fittings and production equipment present in the room. This problem is enhanced with more effective insulation of buildings. There are several known methods of increasing the humidity of air. According to one such known method air is brought into contact with the surface of water with the aid of an evaporator, therewith vaporizing the water. It is normal to heat the water and to increase the surface contact area of the water with the air, so as to increase vaporization.

One problem encountered with water evaporators is that the heating devices used (electrical resistors, piezoelectric elements and the like) tend to become coated with contaminants present in the water, e.g. calcium compounds. Another problem resides in the necessity of enlarging the contact surface between water and air. Irrespective of whether enlargement is effected by generating turbulence in the water or by dispersing the water in fine-droplet form, small water droplets are unavoidably entrained by the departing water vapor, therewith reducing the efficiency of the humidifier and engendering the risk that bacteria, lime etc. will accompany the droplets.

There are several known methods for cleansing liquids and for separating liquids at low temperatures close to atmospheric. These methods have been developed primarily for separating sea-water distillates, although they can, of course, be used in conjunction with other liquids. One simple example of such distillation processes is that effected by the sun, in which water is vaporized from a flat surface by heat from the sun and the subsequent water vapor is condensed on an air-cooled or a water-cooled surface located in the same room or in an adjacent room.

In accordance with another known method, designated "humidification-dehumidification", water vapor is carried away by a stream of air and is condensed by a more or less complicated process; c.f. for instance U.S. Pat. No. 4,350,570 and 4,383,703.

The aforesaid methods and conventional distillation processes require the provision of large vapor chambers, and hence the yield is low in relation to the necessary volumetric capacity of the apparatus used and the capital costs incurred.

In accordance with another known method of the aforementioned kind, designated membrane distillation, vapor is allowed to condense directly into a colder flow on the opposite side of a membrane which is placed adjacent an evaporation surface. Examples of this known method are found described in U.S. Pat. No. 3,340,186 and 4,476,024. The theoretical yields of these techniques (membrane distillation) and the yields actually obtained therewith in practice are recited in the article entitled Low Energy Cost Desalination Processes Using Hydrophobic Membranes and included in the Proceedings of the Second World Congress on Desalination and Water Re-use, November, 17-21, volume 3, pages 277-286.

A similar method which employs the use of a separate chamber for distillate between a membrane and a cooling flow is found described in U.S. Pat. No. 3,563,870 and European Patent Application No. 0088315.

The yield obtained with systems employed in the aforementioned membrane distillation techniques is restricted by the fact that the presence of a flow on the condensation side of the membrane impedes the transportation of both air and heat through the membrane. The yield of such systems can be improved to some extent, by arranging a stationary air gap on the condensation side of the membrane, for example in accordance with Swedish Patent Specification 419699.

The object of the present invention is to provide an apparatus of the kind defined in the introduction which has a markedly higher efficiency than prior art apparatus of a similar kind.

SUMMARY OF THE INVENTION

The evaporator of the inventive apparatus has an inlet for flowing gas provided on the input side thereof. The evaporator also incorporates between the input side and output side thereof, channels through which the flowing gas is conducted and which are partially delimited by liquid-restraining walls made of a hydrophobic material.

BRIEF DESCRIPTION OF THE DRAWINGS

The invention will now be described in more detail with reference to the accompanying schematic drawing, in which FIG. 1 illustrates an air humidifier, and FIG. 2 illustrates a liquid cleansing apparatus.

DESCRIPTION OF PREFERRED EMBODIMENTS

The air humidifier illustrated in FIG. 1 includes a liquid (water) inlet 1 and an evaporator 2, the input side 21 of which is connected to the inlet 1 and which includes liquid-restraining walls 23, 24, 25, 26 which are made of a vapor-permeable, hydrophobic material and which restrain spreading of the liquid, as indicated by the arrows shown in full lines.

Arranged adjacent the input side 21 of the evaporator is an inlet 28 through which gas flows into the evaporator, the gas in this case being air. Extending between the input side 21 and the output side 22 of the evaporator 2 are channels, shown in broken lines, which are defined in part by the liquid-restraining, vapor-permeable walls 23, 24, 25, 26. The humidifier is configured so that the air will circulate through the inlet 28 and carry vapor which has permeated through the walls 23, 24, 25, 26 of the evaporator out through the output side 22 of the evaporator and into the surrounding room or space.

Although the level of humidity can be adjusted manually, e.g. by adjusting the quantities of air and/or water used, it is preferred to effect these adjustments automatically with the aid of a humidity gauge and control devices which control automatically, e.g., the temperature to which the incoming water is heated through the intermediary of the illustrated heating elements 63, 64, 65. This can be achieved by coupling the conduit system 1-27 to the system normally used to heat the room or space served by the humidifier. Such systems will in themselves afford satisfactory automatic adjustment of humidity levels, since the extent to which the air need be moistened is proportional to the amount of heat delivered to the room or space.

In the case of domestic installations, the exemplifying humidifier may be placed vertically and water introduced through the conduit 27. This water will run slowly down through the evaporator 2, in the opposite direction to the full arrows, wherewith part of the water will vaporize and pass in vapor form through the permeable walls 23, 24, 25, 26 and be carried out by the circulating air into the room or space, in the same direction as that indicated by the broken arrows. Circulation can be achieved, in certain cases, through the action of natural forces, while in those cases where natural forces will not suffice a fan 5 may be mounted on the output side 22, in the illustrated manner.

Alternatively, the humidifier may be installed with the evaporator extending horizontally and forming part of a ventilation system.

The water vapor engendered by the described and illustrated humidifier will be completely free from bacteria and virus.

FIG. 2 illustrates a further example of how the inventive concept can be applied. Thus, FIG. 2 illustrates schematically a liquid cleansing apparatus which comprises an inlet 1 for the liquid (liquids) to be cleansed, separated), an evaporator 2, the input side 21 of which is connected to the inlet 1, a condensation chamber 3, which is connected to the output side 22 of the evaporator 2, and a closed loop 4 through which gas is conducted between the output side 22 and the input side 21 of the evaporator 2.

Extending between the input side 21 and the output side 22 of the evaporator 2 are first channels which conduct the liquid arriving through the inlet 1, e.g. contaminated water having a temperature of 40° C., and which are defined by respective walls 23-24, 25-26 made of a vapor-permeable and hydrophobic material. Thus, when the apparatus is in operation, the water will pass along the channels and part of the water will vaporize and pass in vapor form through the channel-defining walls 23-26, while the remainder of the water will be led away through an outlet 27 located on the output side 22 of the evaporator. Arranged on the input side 21 of the evaporator 2 is a gas inlet 28 together with second channels, e.g. channels 23-29, 26-29, for conducting the gas through the evaporator. These second channels are thus defined partially by the walls 23-26 and partially by the external wall 29 of the evaporator 2.

The loop 4 incorporates at a first location between the evaporator 2 and the chamber 3 a fan 5 by means of which the vapor and gas mixture is transported to the condensing chamber 3, and at a second location downstream of the chamber 3 incorporates a pressure and temperature regulator 7. The vapor and gas mixture is thus transported by means of the fan 5 to the chamber 3, in which the vapor separates from the gas and the gas bubbles up through the water 31 and passes through the upper part of the conduit 4 for re-use in the system. The cleansed water departs from the chamber through a separate clean-water outlet 33.

The condensing chamber 3 comprises a vessel which contains cool distillate and in which the incoming vapor condenses. Arranged closely adjacent the bottom of the vessel is an hydrophobic membrane 32 through which the vapor and gas mixture passes.

The condensing chamber 3 and the evaporator outlet (liquid outlet) 27 are cooled with the aid of a heat pump 6 or some equivalent device coupled to transport heat from the condensing chamber and the liquid outlet 27 to the liquid inlet 1. The heat recovered therewith (at 61 and 62 respectively) is used for heating the water entering through the inlet 1 (at 63).

It will be understood that many modifications can be made within the scope of the inventive concept. For example, the channels which conduct the incoming liquid and which together form a closed chamber having both an inlet and an outlet may have a rectangular, cylindrical or helical shape. As beforementioned, the apparatus may also be used to separate one liquid from another, in which case the liquid fed to the inlet 1 will have several liquid constituents. Furthermore, the pressure and temperature in the evaporator and in the condensing chamber respectively may be adjusted to values at which one liquid at a time is distilled from the "liquid" entering through the inlet 1.

The hydrophobic material used for the vapor-permeable walls may be a polytetrafluoroethylene having a pore size of five microns and a porosity of 95%. The temperature of the liquid will normally lie within the range of 70° to 80° C., and the water pressure will be suitably atmospheric pressure. In order to prevent clogging of the membrane, the amount of water recovered is preferably maintained at 50 to 70% by volume. The water may be heated by microwave energy, in many cases.

I claim:
1. A liquid evaporating apparatus, comprising:
   a) an elongate gas flow chamber (2) having a gas inlet (28) at one end and a gas outlet (22) at another, opposite end,
   b) an elongate liquid chamber disposed within the gas chamber and having a liquid inlet (1) at said one end and a liquid outlet (27) at said opposite end,
   c) the liquid chamber being defined by a plurality of parallel liquid flow channels branching out from the liquid inlet and converging together at the liquid outlet, said flow channels being formed by a vapor-permeable, liquid-restraining material serving as a common diverting wall (23, 24, 25, 26) separating gas in the gas chamber from a liquid in the liquid chamber, wherein the liquid fills the liquid chamber to establish contact with the wall material throughout the liquid chamber, and
   d heating means (63, 64, 65), disposed in the liquid flow channels, for heating said liquid and causing evaporation thereof within the liquid chamber,
   e wherein said vapor-permeable, liquid-restraining material comprises a hydrophobic material such that purified vapors of said liquid pass through the wall material for entrainment by gas flowing through the gas chamber.

2. Apparatus according to claim 1, wherein the gas flow is an air flow and the liquid flow is a water flow.

3. Apparatus according to claim 1, further comprising a condensing chamber (3) connected to the gas outlet.

4. Apparatus according to claim 3, further comprising a heat pump (6) coupled to the condensing chamber, the liquid outlet, and the liquid inlet to transport heat from the condensing chamber and the liquid outlet to the liquid inlet.

5. Apparatus according to claim 3, further comprising a closed gas loop (4) coupled between the condensing chamber and the gas inlet, and fan means (5) for transporting gas mixed with entrained vapor to the condensing chamber (3).

6. Apparatus according to claim 5, further comprising a heat pump (6) coupled to the condensing chamber, the liquid outlet, and the liquid inlet to transport heat from the condensing chamber and the liquid outlet to the liquid inlet.

7. Apparatus according to claim 5, wherein the condensing chamber (3) contains a liquid bath (31) of previously condensed vapor in communication with the gas outlet, such that vapor contained in the gas will condense on the surface of said bath in the chamber (3).

8. Apparatus according to claim 7, further comprising a heat pump (6) coupled to the condensing chamber, the liquid outlet, and the liquid inlet to transport heat from the condensing chamber and the liquid outlet to the liquid inlet.

9. Apparatus according to claim 7, further comprising a vapor-permeable hydrophobic membrane (32) arrangement in the condensing chamber adjacent the gas outlet.

10. Apparatus according to claim 9, further comprising a heat pump (6) coupled to the condensing chamber, the liquid outlet, and the liquid inlet to transport heat from the condensing chamber and the liquid outlet to the liquid inlet.

* * * * *